United States Patent Office 2,839,590
Patented June 17, 1958

2,839,590

PRODUCTION OF CYCLOHEXENES

Lloyd C. Fetterly, El Cerrito, Calif., assignor to Shell Development Company, New York, N. Y., a corporation of Delaware No Drawing. Application March 14, 1955
Serial No. 494,251

10 Claims. (Cl. 260—666)

This invention relates to a process for the production of hydrocarbons containing the cyclohexene nucleus, and more particularly to the production of cyclohexene.

Cyclohexene is of considerable commercial significance as starting material in the synthesis of various useful products. Thus, it can be utilized for the production of adipic acid, used in the production of polyamides such as nylon, and for the production of caprolactam, also used in the production of synthetic fibers. However, there is no economical, commercially feasible process available for its production. Attempts to dehydrogenate cyclohexane have not provided a satisfactory process for the large scale production of cyclohexene. It may be prepared by the removal of water from cyclohexanol, but this requires the production of cyclohexanol, as by the hydrogenation of phenol, thus making this process economically unattractive.

It is a principal object of the present invention to provide an improved process for the production of hydrocarbons containing a cyclohexene nucleus. A more specific object is to provide an improved process for the production of cyclohexene.

It has now been found that hydrocarbons containing the cyclohexene nucleus can be produced by the conversion of phenyl-cyclohexane hydrocarbons at an elevated temperature by a short contact time with a thermally stable, solid, high melting point, acidic inorganic substance.

Various types of catalytic materials have been found to be suitable for the practice of the invention, and particularly the acidified clays, both natural and synthetic. The catalyst is required to have an acidic character to effect the desired cleavage between the phenyl and the cyclohexyl groups, which appears to involve an ionic carbonium mechanism. At the same time, the isomerization activity of the catalyst must be minimized in order to minimize the isomerization of the cyclohexyl radical (with dehydrogenation) to methylcyclopentenes, isomers of the desired cyclohexene.

The difficulty encountered heretofore in attempts to dehydrogenate cyclohexane directly to cyclohexene has been that catalysts which bring about suitable dehydrogenation of the cyclohexane either catalyze the disproportionation of the cyclohexene to cyclohexane and benzene and/or they catalyze the isomerization to methylcyclopentenes.

It has now been found that phenylcyclohexane hydrocarbons can be cracked by short actual contact time at an elevated temperature with acidic cracking catalysts, while minimizing isomerization, to yield cyclohexene hydrocarbons. In order to insure the required short actual contact time, the size of the catalyst pores should be sufficiently large to permit relatively free escape of the material therefrom. In general the average pore diameter of the catalyst should be at least about 80 Angstrom units, with materially improved results being obtained when it is at least about 150 Angstroms. Certain natural clays, hydrated aluminum silicates, such as those with average pore diameters of 200–1000 Angstroms are outstandingly useful for the present purpose. Although the reason is not completely understood, the use of fresh or equilibrium commercial hydrocarbon cracking catalysts, such as the usual alumina-silica gel catalysts containing 7–15% alumina, and the UOP "B" catalyst, a zirconia-alumina-silica catalyst, results in an undesirable amount of isomerization and production of the methylcyclopentenes. The average pore diameters of such catalysts generally range from about 20 to about 75 Angstroms, more often from about 30 to 60 Angstroms. However, synthetic siliceous catalysts with larger pore sizes, which are prepared by methods already proposed to yield catalysts with larger pore sizes, may be utilized with a reduced amount of isomerization.

It is usually advantageous to use a catalyst which is only weakly acidic, particularly when the pore size is relatively low, such as from about 80 to 150 Angstroms average diameter. It appears that weakly acidic sites on the catalyst surface are sufficiently effective for the desired conversion of the phenylcyclohexane hydrocarbon to a benzene hydrocarbon and a cyclohexene hydrocarbon. On the other hand, for the same actual contact time between the hydrocarbon and the acid site on the catalyst, the stronger the "acidity" of the acid site the greater is the chance that the cyclohexyl group will be dehydroisomerized to a methylcyclopentene. However, the acid strength of a given acid site appears to be dependent on its particular environment on the surface of the catalyst. For instance, although a washed, unacidified, natural clay, such as "Attaclay," an Attapulgus clay product of the Attapulgus Clay Company, has acid sites attributable to surface protons, they have in their immediate environment basic ions such as potassium, calcium, and magnesium. Acid treatment replaces some of these basic ions by other protons (hydrogen ions), thus increasing the concentration or population of proton (acid) sites; at the same time there is an apparent increase in the number of acid sites of higher acid strength.

Conversely, the acid strength, hence activity, of a strongly acidic catalyst may be reduced by the addition of various metallic ions, particularly highly basic ones such as the alkali metal and alkaline earth metal ions, or other metallic ions which "poison" a portion of the acid sites, particularly the stronger ones.

It will be understood from the foregoing that the principal controlling factor is the contact time with the acid sites of the catalyst, contact with inert surface being immaterial. Hence, for the same mass flow rate over a given catalyst, the effective contact time is directly proportional to the surface area and to the number of acid sites per unit area of catalyst surface. It will also be understood that the catalyst material can be effectively used when spread upon the surface of a catalytically inert support which may be employed to impart greater mechanical strength to the catalyst mass.

In general the mass contact time of the hydrocarbon with the catalyst should be no more than about 0.1 second. This low contact time is advantageously brought about by passing the vaporized hydrocarbon over the catalyst at a low partial pressure, as by the use of a subatmospheric total pressure and/or by dilution with a suitable molar proportion, such as from 1 to 10, of an inert gaseous or vaporous substance, such as nitrogen, steam, mixtures thereof, and the like. Steam is particularly useful as diluent, possibly because of its tendency to displace reaction product from the catalyst surface, thus minimizing isomerization of the cyclohexene, and its tendency to oxidize any carbon which may tend to form on the catalyst, particularly at very active areas thereof.

Although the invention is particularly useful in the preparation of cyclohexene, it is also useful in the preparation of hydrocarbon-substituted cyclohexenes, particularly the lower alkyl-substituted cyclohexenes containing from 1 to 5 alkyl carbon atom substitutents, in one or more alkyl radicals, such as methylcyclohexenes. For example, 4(p-tolyl)-1-methylcyclohexane (derivable from p,p'-ditolyl) gives rise to 4-methylcyclohexene-1, while 2(o-tolyl)-1-methylcyclohexane (derivable from o,o'-ditolyl) yields a mixture of 2- and 3-methylcyclohexene-1. Also, in addition to the conversion of the indicated dicyclic hydrocarbons containing a single cyclohexyl and a single phenyl ring, tricyclic substances are suitably converted by the invention wherein there may be two of one of the rings and one of the other, such as in p-dicyclohexylbenzene, which would be obtainable by the hydrogenation of the external rings of terphenyl, usually obtained to some extent in the pyrolysis of benzene to diphenyl.

The temperature to be used in the practice of the invention will usually range from about 350° C. to about 650° C., this being correlated in part to the contact time and the catalyst activity. It is generally preferred to utilize a temperature of from about 400° C. to about 625° C., a temperature of from 450° to 600° C. giving particularly good results.

The phenylcyclohexane hydrocarbons may be provided for the process by any known suitable method, such as by the partial hydrogenation and coupling of aromatics as disclosed by Truffault, Bull. Soc. Chim. No. 5, vol. 1, pages 391–406 (1934). Phenylcyclohexane is obtainable by the partial hydrogenation of diphenyl over a suitable hydrogenation catalyst, such as palladium.

It is a particular aspect and advantage of the present invention that the conversion of phenylcyclohexane can be carried out in the presence of the other products in the effluent stream from the hydrogenation of diphenyl in the preparation of the phenylcyclohexane. This avoids the necessity for separating the phenylcyclohexane from the other substances at this stage of the process. The unchanged diphenyl and any dicyclohexyl hydrocarbons pass through the conversion zone largely unchanged, serving as inert diluent to reduce the contact time of the phenylcyclohexane with the catalyst, for a given mass flow rate per unit volume of catalyst. The reaction effluent is then readily fractionated to recover the unchanged materials, diphenyl, phenylcyclohexane and dicyclohexyl, as a higher boiling fraction and this is advantageously recycled to the hydrogenation zone wherein at least a portion of the dicyclohexyl is dehydrogenated with equilibration to phenylcyclohexane, thereby minimizing the net loss of diphenyl to dicyclohexyl. In fact, it will be seen that these higher molecular weight materials may be thus recycled essentially to extinction. The lighter effluent fraction is separated, as by distillation, which may include extractive distillation and/or azeotropic distillation, and/or by solvent extraction, or adsorptive separation, to separate the cyclohexane, the benzene and the methylcyclopentenes. The recovered benzene is recycled, combined with fresh benzene, for pyrolysis to diphenyl, then by hydrogenation to phenylcyclohexane, in admixture with recycled heavier products from the conversion zone. The recovery methylcyclopentenes are suitably isomerized and dehydrogented to benzene, preferably in admixture with fresh benzene precursor as when it is being prepared from some light petroleum naphtha fraction as by a "Platforming" operation thereon. In that case, the benzene is suitably recovered from the hydroformate ("Platformate") by any of the known processes, such as solvent extraction or adsorption separation combined with distillation and/or extractive or azeotropic distillation.

Having described the general nature of the invention and the various factors which are involved in its practice, further details of its application will be given in illustrative examples, wherein the cracking was carried out in a conventional ⅝ inch inside diameter down-flow hot stainless steel tube reactor using a catalyst bed of variable depth, usually 25 to 50 ml. volume, with an upper layer of glass beads acting as a preheating section. Both hydrocarbon and water were metered into the unit at atmospheric pressure, the water passing through a separate preheater to provide the high reaction temperature. Products were condensed and the water separated before distillation. Analyses were made by mass spectrometry, ultra-violet spectrometry and infra-red spectrometry.

*Example I*

Phenylcyclohexane was cracked over acid-treated "Attaclay" on Aloxite carrier, at atmospheric pressure, 560° C. and a liquid hourly space velocity (LHSV) (liquid volume of hydrocarbon per volume of catalyst per hour) of 4.8 with a steam to hydrocarbon molar ratio of 10:1. A conversion of 50% of the hydrocarbon was obtained, with a product analysis as follows: 50% w. benzene, 1% w. naphthenes (cyclohexane and methylcyclopentanes), 0.5% $C_6$-diene, remainder $C_6H_{10}$ (40% cyclohexene, 40% 1-methylcyclopentene and 20% 3- and 4-methylcyclopentenes).

The acid treated "Attaclay" passed through 325 mesh screen and had a surface area of 145 square meters per gram (nitrogen determination). It contained about 5.7% alumina, the remainder being essentially silica, except for about 1% K, 2.2% Fe, 5.0% Mg, 0.3% Ti with traces of several other metals. Its average pore diameter was about 240 A., with about 70% of its total pore volume attributable to macro pores (>100 A.). It was applied to the Aloxite carrier in about 10–15% w. proportions, to provide a more physically stable catalyst mass and to provide an increased external available area.

*Example II*

When Example I was repeated, except at a lower temperature of 500° C., the conversion was reduced to about 27%, with essentially the same distribution of cyclohexene and methylcyclopentenes in the product.

*Example III*

When Example I was repeated, except that the catalyst was a Mallinckrodt Kaolin deposited on Aloxite, the conversion was 17.2%, while the product distribution was more favorable to the cyclohexene. The product (benzene free basis) contained, on percent by weight basis (same as mol percent basis), 46.6% cyclohexene, 36.3% 1-methylcyclopentene and 17.1% 3- and 4-methylcyclopentene.

The kaolin had a surface area of about 10–15 m.²/g., passed through 325 mesh, had an average pore diameter of 1000 A., and 66% of its total pore volume was attributable to macro (>100 A.) pores. It was a high alumina (ca. 40%) alumina-silica material containing of the order of 1% Ti and 1% alkali metal with traces of other metals.

*Example IV*

When Example I was repeated, but using a catalyst of untreated Attaclay on Aloxite, a conversion of 15.3% was obtained at a considerably more favorable product distribution for cyclohexene. The product (benzene free basis) contained 60% cyclohexene, 23% 1-methylcyclopentene and 17% 3- and 4-methylcyclopentene.

The untreated Attaclay had a surface area about 110 m.²/g., and essentially the same pore diameter and volume as the acid treated Attaclay. It contained about 10–12% alumina, about 67% silica, about 1.1% K, 3–4% Fe, 9–11% Mg and 1–2% calcium oxide, and traces of other metals.

As already indicated, the more active catalysts which also have relatively low average pore diameters result in excessive isomerization. This is demonstrated by the results of an experiment similar to Example I, except that the catalyst was a UOP "B" catalyst (zirconia-alumina-silica). At a conversion of 51%, the product (benzene free basis) was essentially all 1-methylcyclopentene. Similarly, a magnesia-silica cracking catalyst (average pore diameter of about 20 A.), at a conversion of about 80%, gave cyclohexene and methylcyclopentenes in a ratio of about 1 to 10.

When it is desirable to increase the net yield of cyclohexene, particularly where the $C_6H_{10}$ product mixture comprises no more than about 40% cyclohexene, the remainder being essentially methylcyclopentenes, the separated methylcyclopentenes can be advantageously recycled to the catalytic reaction zone wherein the net effect of the result will be equivalent to the isomerization of a portion of it to cyclohexene.

I claim as my invention:

1. A process for the preparation of cyclohexene which comprises passing phenylcyclohexane over an aluminous siliceous natural clay, having an average pore diameter of at least 80 Angstrom units at a temperature of about 350–650° C. and a contact time of not over about 0.1 second, and recovering cyclohexene from the cracked product.

2. A process for the preparation of cyclohexene which comprises passing phenylcyclohexane over an aluminous siliceous natural clay having an average pore diameter of at least 200 Angstrom units, at a temperature of about 400–625° C., and a contact time of not over about 0.1 second, and recovering cyclohexene from the cracked product.

3. A process in accordance with claim 2, wherein the catalyst is a kaolinite clay and the temperature is from about 450° to about 600° C.

4. A process in accordance with claim 1, wherein the phenylcyclohexane is admixed with from 1 to 10 molar proportions of steam.

5. A process in accordance with claim 1, wherein the phenylcyclohexane is in admixture with diphenyl and dicyclohexyl, and wherein unreacted phenylcyclohexane, diphenyl and dicyclohexyl are recovered from the cracked product effluent and combined with a further amount of diphenyl and the mixture partially hydrogenated to provide phenylcyclohexane-containing mixture as feed material for the catalytic conversion to produce cyclohexene.

6. A process for the preparation of a cyclohexene hydrocarbon which comprises passing a phenylcyclohexane hydrocarbon having no more than 5 carbon atoms in alkyl substituent groups over an aluminous siliceous natural clay having an average pore diameter of at least 80 Angstrom units, at a temperature of from 350° to 650° C. and a contact time of not over about 0.1 second, and recovering said cyclohexene hydrocarbon from the cracked product.

7. A process in accordance with claim 6, wherein the phenylcyclohexane hydrocarbon contains a hydrocarbon substituent on the cyclohexane nucleus in addition to the phenyl radical and wherein the cyclohexene hydrocarbon is a hydrocarbon-substituted cyclohexene.

8. A process in accordance with claim 6, wherein the phenylcyclohexane hydrocarbon is an alkylphenyl alkyl cyclohexane and the cyclohexene hydrocarbon is an alkylcyclohexene.

9. A process in accordance with claim 6, wherein the phenylcyclohexane hydrocarbon is 4(p-tolyl)-1-methylcyclohexane and the cyclohexene hydrocarbon is 4-methylcyclohexene-1.

10. A process for the preparation of cyclohexene which comprises passing phenylcyclohexane over an aluminous siliceous natural clay having an average pore diameter of at least 80 Angstrom units, at a temperature of from about 350° to 650° C. and a contact time of not over about 0.1 second, recovering cyclohexene and methylcyclopentenes from the cracked product and recycling the methylcyclopentenes to the conversion zone with a further portion of phenylcyclohexane.

References Cited in the file of this patent

UNITED STATES PATENTS

| 2,305,220 | Legg | Dec. 15, 1942 |
| 2,519,719 | Sturrock et al. | Aug. 22, 1950 |

OTHER REFERENCES

Greensfelder et al., Ind. and Eng. Chem., vol. 37, No. 11 (1945), pages 1038–1943.

Greensfelder et al., Ind. and Eng. Chem., vol. 37, No. 12 (1945), pages 1168–1176.

Haensel et al., Ind. and Eng. Chem., vol. 41 September (1949), pages 1914–1922.